United States Patent [19]

Saurwein

[11] Patent Number: 4,848,671
[45] Date of Patent: Jul. 18, 1989

[54] HIGH PRESSURE WATER/ABRASIVE JET CUTTING NOZZLE

[76] Inventor: Albert C. Saurwein, 5 F St. SE., Auburn, Wash. 98002

[21] Appl. No.: 107,414

[22] Filed: Oct. 13, 1987

[51] Int. Cl.⁴ .............. B05B 15/08; B05B 1/00; F16L 55/00; E04B 2/00
[52] U.S. Cl. .................... 239/587; 239/600; 285/178; 51/439
[58] Field of Search .............. 239/587, 600, 269; 285/178; 51/439

[56] References Cited

U.S. PATENT DOCUMENTS

| | | | |
|---|---|---|---|
| 1,170,019 | 8/1916 | Sweet | 51/439 X |
| 2,332,407 | 10/1943 | Spenle | 51/439 |
| 3,337,181 | 8/1967 | Wennerstrom | 285/178 X |
| 3,508,580 | 4/1970 | Snyder | 285/178 X |
| 4,545,157 | 10/1985 | Saurwein | 51/439 |

FOREIGN PATENT DOCUMENTS 1525529 11/1969 Fed. Rep. of Germany ........ 51/439

Primary Examiner—Andres Kashnikow
Assistant Examiner—Patrick N. Burkhart
Attorney, Agent, or Firm—Harry M. Cross, Jr.

[57] ABSTRACT

A high pressure water/abrasive jet cutting nozzle has a pair of centering rings that act through body-mounted balls to position a nozzle element-holding collet. The interior surfaces of the centering rings are eccentric with respect to the longitudinal axis of the nozzle assembly so that rotation of a centering ring will cause the nozzle element collet to shift transversely. By rotating one or the other, or both, centering rings the axis of the nozzle element can be adjusted relative to the nozzle jet-forming element so as to align the nozzle element with the water jet.

7 Claims, 1 Drawing Sheet

HIGH PRESSURE WATER/ABRASIVE JET CUTTING NOZZLE

FIELD OF THE INVENTION

This invention pertains to water jet cutting devices wherein high pressure water is entrained with particulate abrasive material for cutting or abrading hard substances.

BACKGROUND OF THE INVENTION

Nozzle assemblies for abrasive-entrained water jet cutting are subjected to substantial wear forces by the entrained abrasive material. A typical nozzle assembly uses a mounted jewel element, having a small diameter orifice, to form the initial water jet stream from a source of high pressure water. Downstream of the jewel element, particulate abrasive material is introduced to the water jet stream. The combined water/abrasive jet stream is then directed through an elongated nozzle element wherein the abrasive material become distributed throughout the jet before leaving the assembly. If the jewel mounting or the jewel orifice is not centered exactly, the initial water stream may be off center with respect to the nozzle element. Likewise, if the nozzle element is not centered exactly in the assembly, the nozzle element may be off center with respect to the water stream. In either case, when abrasives are added to the water stream, accelerated erosion of the nozzle element will occur, resulting in much reduced life of the nozzle element. Moreover, out-of-center alignment within the assembly may also result in degrading the jet stream itself to such an extent that the cutting ability of the abrasive/water jet is markedly reduced.

A primary object of the present invention is to provide a nozzle assembly with a nozzle element centering mechanism. By the use of such a mechanism alignment of the nozzle element and the jewel element can be attained notwithstanding assembly or manufacturing errors or imperfections. A further object is to provide such a centering mechanism that can be manually adjusted while the nozzle is operating, whereby the results of the adjustment can be observed during the adjustment phase. Another object is to provide such a centering mechanism in the nozzle assembly at a location such that the nozzle element can be replaced when worn without interference with the centering mechanism.

SUMMARY OF THE INVENTION

The nozzle assembly of this invention comprises a jewel-mounting element, a wearable and replaceable nozzle element aligned with the jewel, a nozzle body in which both the jewel-mounting element and the nozzle element are retrained, and a nozzle element centering mechanism also retained by the nozzle body for adjustment of the nozzle element alignment with respect to the jewel. The centering mechanism permits the position of the nozzle element to be shifted transversely to the axis of the nozzle assembly in an "X" direction, a "Y" direction or in any combination of X and Y coordinates, as desired by the operator. Consequently, a variety of adjustment directions can be tried to find the best alignment possible given the condition of the elements and their assembly that the operator has at hand.

DETAILED DESCRIPTION OF THE DRAWING

Figure 2:
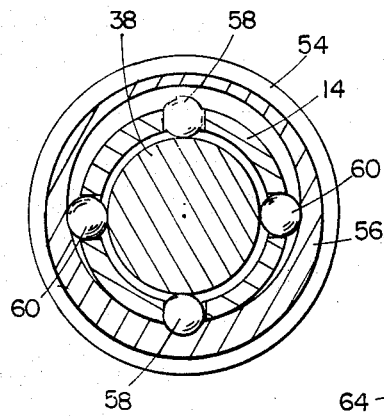
Figure 1:
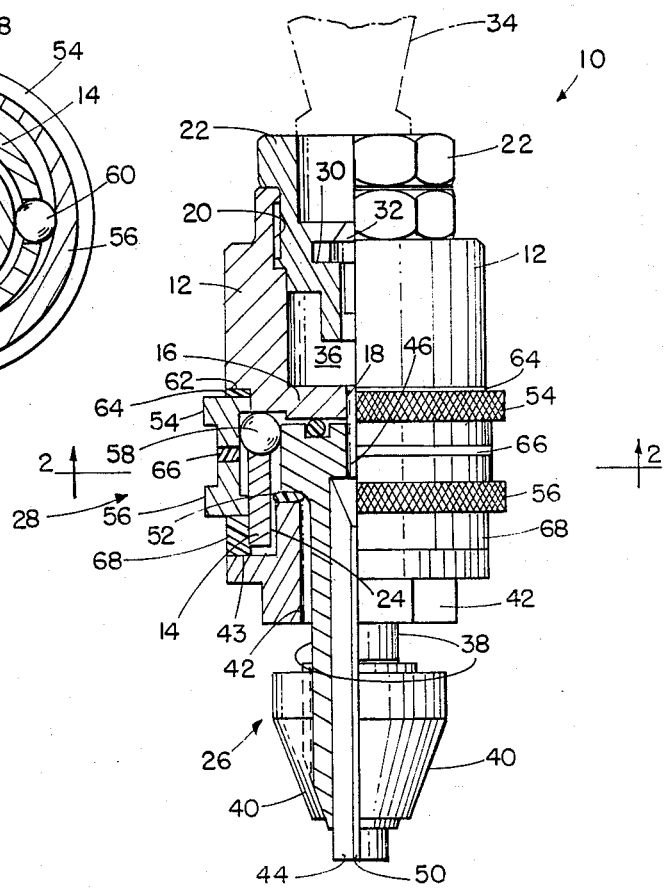

FIG. 1 is an elevation view of nozzle assembly of this invention with the left half shown in cross-section; and FIG. 2 is a cross-section taken along the line 2—2 in FIG. 1 and rotated 90 degrees.

DETAILED DESCRIPTION OF THE INVENTION

The body 10 of the nozzle assembly is a machined cylinder comprised of an upper half 12 and a lower half 14. The two halves are separated by an internal circular web 16 through which is provided an axial fluid passage 18 that connects the halves. The upper half 12 contains an axial cylindrical chamber open at the top, the upper side wall of which is threaded at 20 to receive a jewel-mounting element 22. The lower half 14 also contains an axial cylindrical chamber open at the bottom, the lower side wall of which is threaded at 24 to receive a nozzle mounting 26. Around the periphery of body 10, the nozzle element centering mechanism 28 is carried such that it may be manually adjusted to reposition the nozzle element transversely of the vertical longitudinal axis of the nozzle assembly.

The jewel-mounting element 22 comprises a machined cylindrical member providing an internal annular rim 30 on which a jewel and its mounting 32 is seated. The jewel contains an axial aperature intended to be aligned with the vertical axis of body 10 and passage 18. It is this jewel aperature that forms the water jet stream from high pressure water entering the nozzle assembly from a source indicated in dotted outline 34. The upper chamber in body 10 is formed such that a mixing cavity 36 exists between the bottom of jewel-mounting element 22 and web 16. A passage in the side wall of body 10 provides an entry for particulate abrasive material into the mixing cavity 36. As high pressure water passes through the mixing cavity 36 in the form of a high velocity jet and through passage 18, a vacuum is created within mixing cavity 36. This vacuum draws the particulate abrasive material into the cavity and it becomes entrained in the jet stream and exits through passage 28 with the jet stream.

The nozzle mounting 26 comprises a nozzle element-holding collet 38, a collet nut 40 and a retaining nut 42. An elongated nozzle element 44 is fitted within an elongated passage in collet 38 and secured therein by collet nut 40. Collet 38 is a machined cylindrical member having a circular disk at its upper end that seats against the underside of web 16. The upper circular disk of collet 38 is provided with an axial passage 46 of the same diameter as passage 18. The elongated passage within which nozzle element 44 is positioned is also axially aligned so that the elongated passage 50 through nozzle element 44 is aligned with passages 18 and 46. Retaining nut 42 is screwed onto the lower threaded portion 24 of body 10 and retains collet 38 in the position shown. A shim plate 52 is fitted between the upper edge of nut 42 and the underside of the upper disk portion of collet 38. An annular O-ring fits in an annular groove in the upper surface of the collet circular disk as a seal between the adjacent surface as shown.

The nozzle centering mechanism 28 comprises an upper centering ring 54 and a lower centering ring 56 and two pair of position-transmitting balls 58 and 60. The rings 54 and 56 encircle the lower half of body 10, such lower half being machined to provide a reduced diameter section and an external annular ring-seating rim 62. Two pair of passages are bored through the side wall of the lower half of body 10 for the ball pairs 58 and 60. The passages for ball pair 58 are diametrically opposite one another and are overlaid by upper ring 54. The passages for ball pair 60 are also diametrically opposite one another, but at 90 degrees rotation from ball pair 58, and are overlaid by lower ring 56. The balls of each pair are large enough to protrude from the passages within which they are positioned so that they may contact the outer side of the collet upper disk and the inner side of their respective rings 54 or 56. The collet upper disk has sufficient height to provide contact surface for both pairs of balls, as shown.

The centering rings 54 and 56 have an inner circular periphery that is circular about an eccentric axis. Consequently, as each ring is rotated, the ball pair associated with that ring will shift laterally in the direction of movement of that ring's eccentric axis. Since the ball pairs are positioned at 90 degrees with respect to each other, one ring's axis will be shifted along an "X" coordinate and the other will be shifted along a "Y" coordinate. If only one ring is rotated at a time, the collet 38 will be shifted along that "X" or "Y" coordinate, depending on which ring is rotated. If both rings are rotated simultaneously, the collet axis will be shifted in a direction that is a function of both coordinates and the respective degrees of ring rotations. The cylindrical chamber in the lower half of body 10 has a large enough diameter to provide enough room for collet 38 to shift back and forth and around, as required to establish correct alignment. The shim plate 52 provides a bearing surface on which collet 38 slides as it is moved back and forth and around.

Centering rings 54 and 56 are positioned as shown, with synthetic bearing rings positioned at 64, 66 and 68 to permit frictionless turning. These bearing rings may be fabricated of a material such as Delrin. The retaining nut 42 is provided with an outer annular rim 43 that contacts the lower bearing ring 68. When retaining nut 42 is tightened, the composite ring assembly is confined between the upper rim 62 on body 10 and the lower rim 43 on retaining nut 42. The Delrin rings are somewhat compressible so that retaining nut 42 need not be overly tightened to insure correct positioning of either collet 38 or the centering rings 54 and 56. The centering rings are provided with outer peripheries that extend outward beyond the body 10 and that have knurled outer surfaces to provide grippable surfaces that can be grasped between the thumb and fingers of an operator for rotation.

The various machined parts of the nozzle assembly are preferably fabricated from the following metals: centering rings 54 and 56 and collet nut 40, brass; nozzle element 44, tungsten carbide steel; bearing rings 64, 66 and 68, Delrin plastic; all other parts, stainless steel.

While a preferred embodiment of the centering nozzle assembly of this invention has been described, certain changes may be made without departing from the scope of the invention. Consequently, the scope of the invention is only to be delimited by the appended claims herein.

I claim:

1. A water jet cutting nozzle assembly comprising a nozzle body adapted to receive a water jet-forming element; nozzle element mounting means for mounting an elongated nozzle element in said nozzle body including a nozzle element collet adapted to receive and hold said nozzle element; and nozzle element centering means carried by said nozzle body and externally manipulatable to shift said mounting means transversely to the longitudinal axis of said nozzle assembly whereby the position of said nozzle element can be adjusted relative to the position of said water jet-forming element; said collet having an exterior surface in contact with said nozzle centering means whereby manipulation of said centering means will effect lateral movement of said collet; said nozzle centering means including a pair of centering rings encircling said nozzle body, each having a circular inner periphery eccentric to said nozzle assembly longitudinal axis, and multiple roller means positioned in said nozzle body in contact with the centering ring inner surfaces and said collet exterior surface whereby rotation of a centering ring will effect a transverse shift of said collet.

2. The nozzle assembly of claim 1 wherein said nozzle body is provided with multiple apertures within each of which one of said roller means is positioned; and wherein said nozzle body is provided with an interior chamber within which said collet is positioned; and wherein said nozzle element centering means includes a fastener securing said collet in place while permitting transverse collet movement within said chamber.

3. The nozzle asembly of claim 2 wherein said nozzle body comprises a cylinder having an upper chamber, above said collet chamber, within which said water jet-forming element is to be contained, and a web extending between the two chambers and having a fluid passage therethrough for passage of a water jet from said jet-forming element to said nozzle element; and wherein said collet is seated against the underside of said web by said collet fastener.

4. The nozzle assembly of claim 3 wherein said collet fastener includes an external peripheral extension from which said centering rings are supported in encircling relationship to said nozzle body.

5. The nozzle assembly of claim 1 wherein said nozzle body is provided with an interior chamber within which said collet is positioned; and wherein said nozzle element centering means includes a fastener securing said collet in place while permitting transverse collet movement within said chamber.

6. The nozzle assembly of claim 5 wherein said nozzle body comprises a cylinder having an upper chamber, above said collet chamber, within which said water jet-forming element is to be contained, and a web extending between the two chamers and having a fluid passage therethrough for passage of a water jet from said jet-forming element to said nozzle element; and wherein said collet is seated against the underside of said web by said collet fastener.

7. The nozzle assembly of claim 6 wherein said collet fastener includes an extenral peripheral extension from which said centering rings are supported in encircling relationship to said nozzle body.

* * * * *